United States Patent [19]

Rath

[11] 3,735,996
[45] May 29, 1973

[54] PORTABLE LUGGAGE DOLLY

[76] Inventor: Virgil K. Rath, c/o Rath Manufacturing Co., Janesville, Wis. 53545

[22] Filed: Feb. 15, 1972

[21] Appl. No.: 226,495

[52] U.S. Cl. .................280/35, 280/43.1, 280/47.13
[51] Int. Cl. ..........................................B62d 21/18
[58] Field of Search.................280/35, 37, 43, 43.17, 280/43.14, 43.22, 47.13, 43.1

[56] References Cited

UNITED STATES PATENTS

| | | | |
|---|---|---|---|
| 3,462,171 | 8/1969 | Mitty | 280/43 |
| 3,329,442 | 7/1967 | Vietri | 280/35 |
| 2,899,213 | 8/1959 | Winger | 280/47.13 |
| 1,604,723 | 10/1926 | Rutherford | 280/47.13 |
| 2,008,887 | 7/1935 | Venables | 280/35 |
| 2,359,016 | 9/1944 | Wood | 280/35 |
| 1,105,943 | 8/1914 | Whiteside | 280/37 |

*Primary Examiner*—Leo Friaglia
*Assistant Examiner*—Robert R. Song
*Attorney*—Joseph G. Werner, John M. Winter and James A. Kemmeter

[57] ABSTRACT

A portable wheeled vehicle for moving luggage such as suitcases, trunks and the like. The vehicle has a pair of elongate side support elements connected by a pair of flexible attaching straps which encircle the luggage. The side support elements each have a pair of wheels which are retractable into a protective wheel assembly housing.

4 Claims, 2 Drawing Figures

Patented May 29, 1973 3,735,996
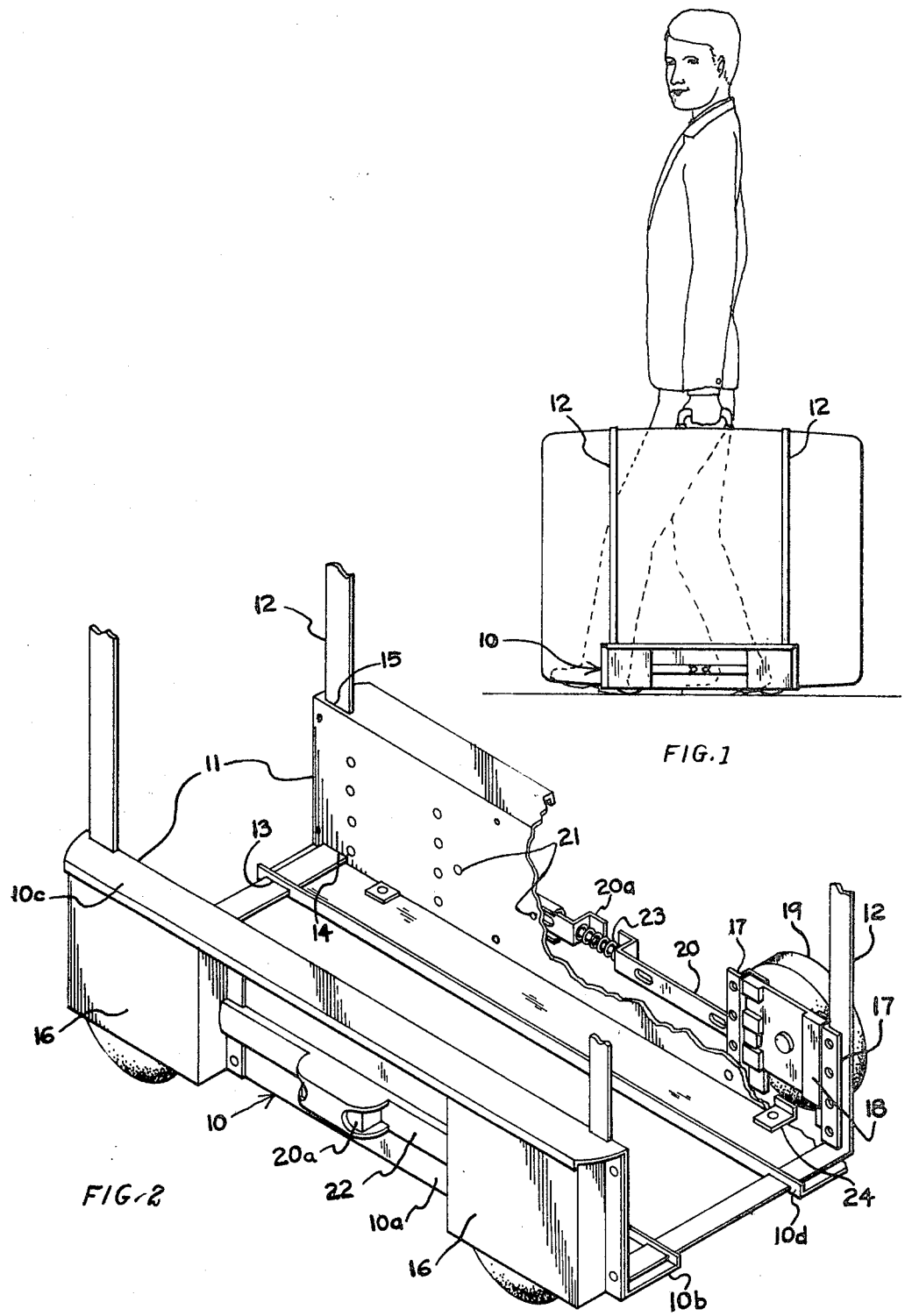

PORTABLE LUGGAGE DOLLY

BACKGROUND OF THE INVENTION

1. Field of the Invention

This invention relates to luggage dollys and more particularly to a light-weight portable dolly which is strapped to the luggage and can be carried therewith.

2. Description of the Prior Art

The general concept of luggage with retractable wheels has been known for some time. For instance, U.S. Pat. No. 1,683,029 discloses a suitcase with wheels which form a permanent part of the suitcase itself and are not detachable therefrom.

In U.S. Pat. No. 2,344,272, the carrier vehicle is demountable from the luggage, but is not designed to be carried with the luggage for loading in automobiles, airplanes, buses and the like. Its weight, size and non-collapsibility prevent it from being carried with the luggage.

U.S. Pat. No. 2,596,578 is directed to a wheeled suitcase wherein the wheels form a permanent part of the suitcase and may be folded into the suitcase for carrying and storage. The case must be lifted to fold away the wheels. This patent also discloses a strap on type vehicle but which does not have retractable wheels.

SUMMARY OF THE INVENTION

Basically, this invention resides in a compact, sturdy and light-weight luggage dolly which can be strapped on virtually any size suitcase, trunk or other luggage that can be encircled by the straps for moving same along on wheels.

The dolly has a pair of side support elements which are adjustably connected only by flexible straps and can therefore be positioned any desired distance apart to receive the luggage. In addition, this feature allows the luggage, such as a suitcase, to be opened by merely loosening the straps without having to lift it off of the dolly.

Each side support element has a pair of wheels which are retractable into a protective housing on the outside of the support elements. Slide elements for locking the wheels in their retracted and extended positions are also enclosed within a protective sleeve to prevent damage to the working mechanism.

The combined features of compact light-weight construction and protective housings for all the working mechanism and wheel assemblies permit the dolly to remain on the luggage during all phases of travel including the transportation of the luggage in an airplane, train, bus, ship or automobile.

BRIEF DESCRIPTION OF THE DRAWINGS

FIG. 1 is a side elevation view of my portable luggage dolly in use on a suitcase.

FIG. 2 is an isometric view of my portable luggage dolly with a portion thereof broken away to facilitate a better understanding of the invention.

DESCRIPTION OF A PREFERRED EMBODIMENT

Referring now more particularly to the drawings wherein like numerals refer to like parts in both views, my portable luggage dolly is shown generally at 10 in FIGS. 1 and 2. The dolly comprises a pair of light-weight metal side support elements 11 which have a generally Z-shaped end profile, as best shown in FIG. 2. Each of the side support elements 11 has a generally rectangular upright wall portion 10a, an inwardly turned generally horizontal bottom flange 10b, and an outwardly turned generally horizontal top flange 10c.

A pair of flexible attaching straps 12 are slidably engaged in and extend between the side support elements. As best seen in FIG. 2, the straps 12 extend outwardly through openings 13 in upwardly turned edges 10d of bottom flanges 10b, through openings 14 in wall portions 10a, and thence upwardly through openings 15 in the top flanges 10c. As shown in FIG. 1, the straps extend upwardly from the side support elements a sufficient length to encircle the luggage to be transported thereon.

The side support elements 11 may be adjusted toward and away from each other on the straps 11 to accommodate luggage of various widths.

Each side support element has a pair of open-bottomed protective wheel assembly housings 16. The housings are made of light-weight metal and are riveted to the outer surface of the upright wall portion 10a at the ends of each side support element.

A pair of guide channels 17 are riveted to the wall portion 10a within each protective wheel assembly housing 16 as illustrated in FIG. 2.

A wheel mounting plate 18, each carrying a wheel 19, is mounted for vertical reciprocation in each pair of guide channels 17 for movement between a lower position whereby said wheels are extended from the protective wheel assembly housings and an upper position wherein said wheels are retracted within said housings.

Each wheel assembly has associated therewith a slide 20 mounted on pins 21 for releasable engagement with a wheel mounting plate for locking the wheels in their extended working position and retracted rest position.

Each pair of slides 20 is encompassed within a protective sleeve 22. The slides of each pair are biased in their extended locking position by a spring 23 mounted between finger tab portions 20a formed on the end of the slides. The finger tab portions are exposed through openings in the protective sleeves 22 to permit the tab portions to be squeezed together against the bias of the springs 23 to permit the wheels to be retracted into their respective protective housing and then released to lock the wheels therein.

It should be noted that the wheels can be retracted without lifting or removing the luggage from the dolly. When the dolly is to be placed in use, one merely squeezes the finger tabs 20a together and the wheels drop down into their extended working position. An abutment 24 limits the downward movement of the wheel mounting plates 18.

It is understood that this invention is not confined to the particular construction and arrangement of parts herein illustrated and described, but embraces all such modified forms thereof as come within the scope of the following claims.

I claim:

1. A portable luggage dolly comprising:
   a. a pair of separate elongate side support elements,
   b. means for operatively connecting said side support elements in a luggage supporting position, said means constituting at least one strap slidably engaging and extending between said side support elements, said strap extending substantially above said side support elements for engagement about a piece of luggage supported on and between said side support elements, c. a pair of open-bottomed protective wheel assembly housings on each of said side support elements, d. a pair of guide channels in each of said protective wheel assembly housings, e. a wheel mounting plate carrying a wheel thereon mounted for vertical reciprocation in each of said pair of guide channels for movement between a lower working position wherein said wheel extends from said protective wheel assembly housing and an upper rest position wherein said wheel is retracted within said protective wheel assembly housing, and f. a pair of spring-biased slides on each of said side support elements engageable with said wheel mounting plates for locking said wheels in their extended working and retracted rest positions.

2. The portable luggage dolly as specified in claim 1 having a protective sleeve encompassing each pair of said spring-biased slides.

3. The portable luggage dolly as specified in claim 1 wherein each of said side support elements is substantially Z-shaped in end profile, each of said side support elements having a substantially upright wall portion integrally connecting an inwardly turned bottom flange and an outwardly turned top flange.

4. The portable luggage dolly as specified in claim 3 wherein said attaching strap extends through openings in each of said bottom flanges, wall portions, and top flanges.

* * * * *